Feb. 18, 1969   E. O. DYE   3,428,554
SEWAGE TREATMENT PROCESS
Filed Dec. 11, 1967
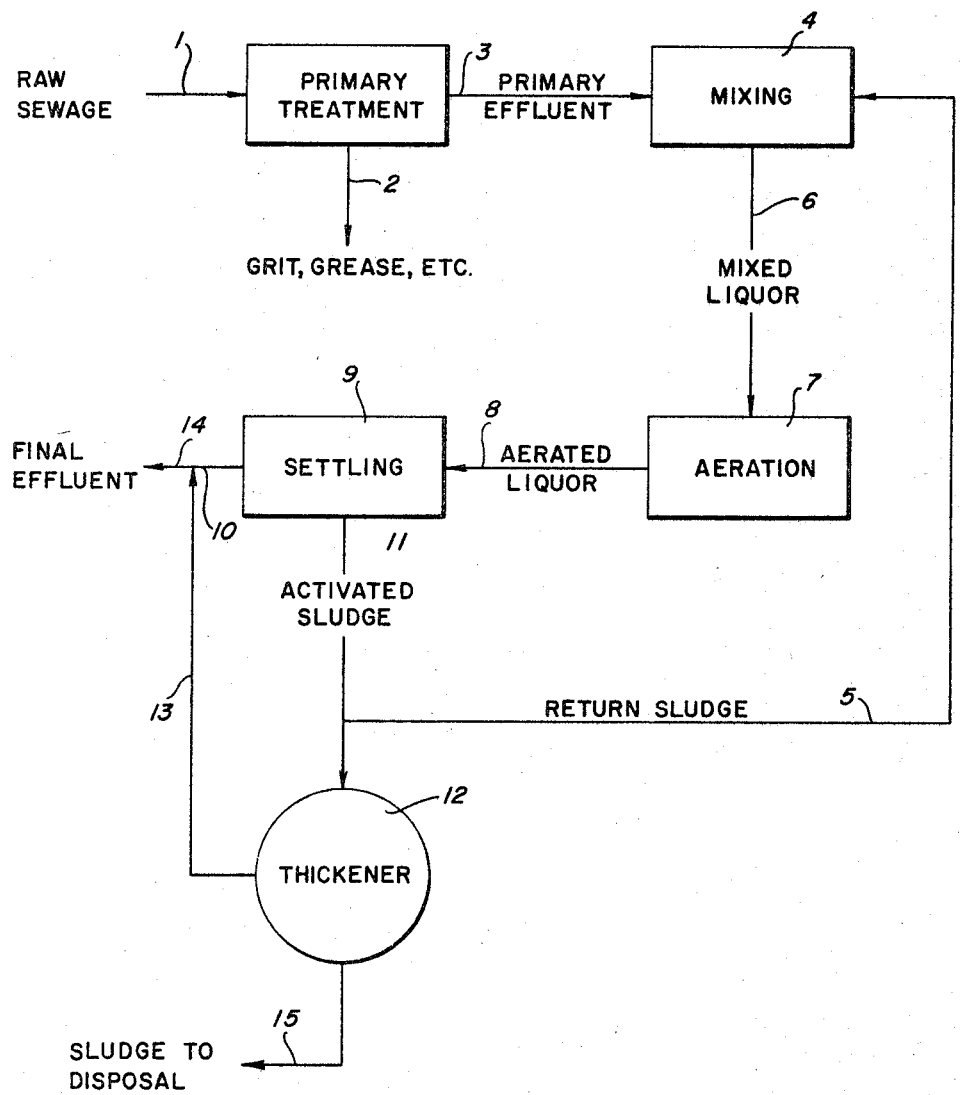
INVENTOR.
E. O. DYE
BY
*Drummond & Cahill*
ATTORNEYS

3,428,554
SEWAGE TREATMENT PROCESS
Edgar O. Dye, 322 N. Plumer Ave.,
Tucson, Ariz. 85719
Filed Dec. 11, 1967, Ser. No. 689,460
U.S. Cl. 210—4                                          3 Claims
Int. Cl. C02c 1/06

ABSTRACT OF THE DISCLOSURE

An improved activated sludge sewage treatment process in which the length of the aeration period is controlled by periodically measuring the ash contents of the mixed liquor suspended solids and return sludge suspended solids. The aeration period is terminated when the ash content of the mixed liquor suspended solids is between about 25–40% and the ash content of the return sludge suspended solids is maintained within −8 to +1 percentage units of the ash content of the mixed liquor suspended solids.

---

This invention relates to sewage treatment processes.

More particularly, the invention concerns methods for aeration of sewage in secondary sewage treatment processes such as, for example, the activated sludge process.

Even more particularly, the invention concerns methods for improving the control of the aeration step of an activated sludge process in order to improve the effectiveness of the process and to obtain improved control and predictability.

In still another aspect, the invention concerns improvements in the aeration step of activated sludge sewage treatment processes which provide for more efficient and complete removal of impurities notwithstanding fluctuations in the characteristics of the raw sewage.

While the following discussion will describe my invention within the context of a typical activated sludge sewage treatment process, it will be understood that the principles of my invention are generally applicable to secondary sewage treatment processes which employ an aeration step.

The activated sludge process is a method for secondary treatment of sewage. Most sewage treatment processes include a preliminary treatment of the raw sewage to remove grit and coarse solids. Generally, this is accomplished by screening and usually involves pre-settling of at least the readily settleable solids. In some plants, fine screening has been substituted for tank settling in the primary treatment stage. Also, the primary treatment stages may include mechanical skimming to remove grease and oil which adversely affect the secondary treatment steps. Primary treatment may also include pre-chlorination to prevent the sewage from becoming septic.

The activated sludge process is widely used to treat the effluent from the primary treatment. The function of any secondary treatment process such as the activated sludge process is the production of a clear final effluent which has low BOD ("Biological Oxygen Demand") and low suspended solids content.

The activated sludge process biologically oxidizes the materials which create BOD and the suspended solids by biological oxidation of the impurities in the presence of adequate oxygen. In the activated sludge process, a biologically active "floc" sweeps through the sewage metabolizing the impurities and thus acting as a moving filter, as distinguished from the stationary zooglea mass or film present on the stones of a trickling filter. The finely divided suspended solids, colloidal solids and dissolved solids in the sewage are adsorbed by the moving activated sludge floc and bacteria and other micro-organisms that metabolize the impurities under aerobic conditions.

The biological oxidation of the impurities in the primary effluent sewage is accomplished by mixing an appropriate quantity of activated sludge with the primary effluent to produce so-called "mixed liquor", aerating the mixed liquor by blowing streams of air through it to promote the bacteriological oxidation of the impurities and produce additional floc, introducing the aerated mixed liquor into a settling basin to allow the floc to settle, decanting the supernatant liquid which is discharged as the final effluent, recycling a portion of the activated sludge floc for mixing with primary effluent and disposing of the excess activated sludge, for example, by a sludge digestion process or by sale as fertilizer, etc.

According to common prior art practices, variations in the exact characteristics of the sewage were not taken into account in selecting the process conditions for the activated sludge process. Thus, the residence time and degree of aeration of the sewage were controlled according to certain general characteristics such as solids content and volume of the primary effluent but little effort was expended in adjusting the process conditions to account for variations in the type of solids in suspension, the distribution of the solids between organic and inorganic materials and the presence of deleterious material such as grease, oil, etc., which escaped the primary treatment. The lack of adjustment of process conditions to meet the variations encountered in domestic sewage from day to day and even from season to season has severely limited the effective capacity of many sewage treatment plants as the ultimate capacity of the plant was affected by its capacity under extremely inefficient conditions.

Consequently, several suggestions have been made in the art for controlling the conditions of treatment in an activated sludge process with reference to measurable process parameters. One of the most effective suggestions of this sort was suggested by Keefer (Journal WPCF, 35, 1166 (September 1963)) in which it was shown that there was a definite relationship between the sludge volume index ("SVI") and the degree of removal of suspended solids and BOD from the final effluent. In general, Keefer's work indicated that the removal of suspended solids and BOD from the effluent reached a maximum within a certain range of sludge volume index. However, to date, the control of the degree of aeration of the mixed liquor has not been effectively accomplished through measurement of sludge volume indices as the determination of sludge volume index requires an appreciable period of time during which the process conditions may change and during which the characteristics of the sewage may vary.

Accordingly, it is a principal object of the present invention to provide an improved method for controlling the process conditions of a secondary sewage treatment process such as the activated sludge process.

Another object of the invention is the provision of improved control of the length of the aeration step in an activated sludge process.

Still another object of the invention is the provision of a method for controlling the degree of aeration of mixed liquor in an activated sludge process to provide an active zoogleal sludge by continuing the aeration sufficiently long to oxidize the organic components in the mixed liquor and to induce proliferation of aerobic organisms, forming a settleable floc, but avoiding the formation of so-called "pin floc" or "bulked" sludge which forms if the aeration is continued too long and which contaminates the final effluent.

These and other objects and advantages of my invention will become apparent to those skilled in the art from the following detailed description thereof taken in conjunction with the drawing, in which:

The figure is a simplified schematic flow sheet of a typical activated sludge sewage treatment process showing the primary and secondary treatment steps.

Briefly, in accordance with my invention, I have now discovered a definite correlation between the ash residues of the mixed liquor suspended solids ("MLSS"), the ash residue of the return sludge suspended solids ("RSSS"), the sludge volume index, and methods for controlling the length of aeration in an activated sludge process, whereby the optimum length of the aeration period is determined by periodic measurement of the ash residues of the MLSS. The MLSS are removed from the aeration tank to the sludge separation units when the ash residue is in the range of about 25–40%. The return sludge suspended solids removed from the separation unit should be immediately returned to the aeration unit in order to maintain a differential between the MLSS and RSSS ash contents within the range −8 to +1 percentage units.

The correlation of these variables and the method of operation of my improved sewage treatment process will be more clearly understood by reference to the figure and the following description.

The figure is a simplified schematic flow sheet of a typical activated sludge sewage treatment process. The raw sewage 1 is introduced to the primary treatment facilities which, as explained above, may include screening, settling and grease skimming, according to the characteristics of the sewage being treated. The settleable solids from the primary treatment 2 are discarded and the primary effluent 3 is introduced to a mixing zone 4 where it is mixed with return activated sludge 5 to form the mixed liquor 6. The mixed liquor 6 is introduced into an aeration tank 7 where compressed air is blown through the mixed liquor for a length of time sufficient to produce activated sludge having the desired characteristics. The aerated mixed liquor 8 which contains the activated sludge in suspension is introduced into a settling basin 9 where the activated sludge floc settles to the bottom of the tank and the final effluent 10 is withdrawn as the supernatant fraction. The activated sludge 11 from the settling basin 9 is introduced to a thickener 12. The additional supernatant liquid 13 is separated from the sludge in the thickener 12, combined with the supernatant 10 from the settling basin 9 and the combined stream 14 is discharged from the sewage treatment plant as the final effluent. The sludge fraction 15 from the thickener 12 is sent to disposal facilities such as, for example, digestion tanks or to a drying and packaging facility where the sludge is prepared for sale as fertilizer. A portion 5 of the activated sludge 11 removed from the settling basin 9 is recycled to the mixing step 4 where it is used to inoculate the primary effluent 3.

In accordance with my invention, I have now discovered that a positive and simple analytical technique enables a sewage plant operator to remove the mixed liquor from the aeration unit at the correct state of aerobic stabilization instead of merely aerating the sewage for a preselected time. In this way, the aerated mixed liquor can be removed from the aeration unit prior to the formation of pin floc or bulked sludge but after the aeration has been continued a sufficient time to form the desired active zoogleal sludge. Thus, in accordance with my invention, I adjust the retention time in the aeration unit to account for variations in the several factors which affect the characteristics of the sludge, namely, solids loading, sludge age, sludge density, recirculation rates, BOD, and the like.

Thus, in order to insure that the mixed liquor is retained in the aeration unit for a sufficient time to accomplish the desired degree of oxidation and assimilation of the solids, yet avoid oxidation which causes the formation of pin or bulked floc, the aeration should be terminated and the mixed liquor should be removed from the aeration unit when the ash residue of the mixed liquor suspended solids falls in the range of about 25–40%, preferably 28–34%, and the ash residual of the return sludge suspended solids is maintained equal to or not more than 8 percentage units less than the ash residual of the mixed liquor suspended solids, preferably 0–2 percentage units lower.

Termination of the aeration step and removal of the mixed liquor can be accomplished by any suitable technique. For example, the aeration can be a batch process, or, alternatively, suitable apparatus may be employed having means for withdrawing the aerated mixed liquor at spaced points along the aeration tank, thereby enabling one to withdraw the aerated mixed liquor after the aeration step has been continued for the proper time.

The differential ash content between the mixed liquor suspended solids and return sludge suspended solids is suitably controlled by adjusting the length of time between the withdrawal of the aerated mixed liquor and the return of a portion of the solids contained in the aerated mixed liquor to the mixing step. For example, as will be appreciated by those skilled in the art, this can be conveniently accomplished by the use of so-called tray settling apparatus.

As used herein, the ash content of the MLSS and RSSS is determined in accordance with "Standard Methods of Water and Sewage Analyses," U.S. Public Health Service.

EXAMPLE

This example illustrates the preferred practice of the invention in a municipal sewage treatment plant employing the activated sludge process to treat a design flow of 12 million gallons per day of raw sewage. The plant includes the following ekuipment:

Primary treatment facilities

Primary treatment facilities include two bar screens, a grit chamber and four primary sedimentation tanks. The bar screens are mechanically cleaned and each is 6 feet wide with 5/16 inch bars having 3/4 inch openings between the bars. A hand cleaned by-pass screen is also provided to avoid reduction in screening capacity during cleaning of the mechanically cleaned screens. The grit chamber consists of two Detritors, each 24 feet square and 1.95 feet deep having a design velocity of 0.8 feet per second at design flow. The primary sedimentation tanks are 96.5 feet long and 31 feet wide and are designed to operate at a water depth of 10 feet. Detention time at design flow is 1.8 hours. Surface loading at design flow is 1000 gallons per square foot per day and overflow rate at design flow is 0.154 cubic feet per second per foot of weir.

Secondary treatment facilities

Secondary treatment facilities include two aeration tanks, two sedimentation tanks and a chlorination chamber. The aeration tanks are 264 feet long, 41 feet wide and are designed for a water depth of 15 feet. Detention time at design flow is 4 hours, including 15% return. Air input is 1.2 cubic feet per gallon. The secondary sedimentation tanks are 100 feet in diameter and 10 feet deep. Detention time at design flow is 2.5 hours, surface loading at design flow is 764 gallons per square foot per day and overflow rate at design flow is 0.0295 cubic feet per second per foot of weir. The chlorination chamber is 98.25 feet long, 48.5 feet wide and 4 feet deep. Detention time at design flow is 20 minutes.

Operation

The sewage treatment facilities described above functioning under conditions of divergent diurnal flows, were operated for one month to treat 8.34 million gallons per day (average) of raw sewage. The following daily average results were obtained:

The raw sewage had a suspended solids content of 243 p.p.m. which was reduced by primary treatment to 73 p.p.m. The BOD of the raw sewage was 189 p.p.m. which was reduced by primary treatment to 110 p.p.m.

Air was supplied to the aerators at the rate of 1.13 cubic feet per gallon and the return activated sludge rate was established at 51.10% of the raw sewage flow rate. Aeration of the mixed liquor was continued until the ash residue of the mixed liquor suspended solids reached 28.0%, at which time the dissolved oxygen in the mixed liquor suspended solids was 1.8 p.p.m. At the end of the aeration period, the mixed liquor contained 1372 p.p.m. suspended solids and the sludge volume index was 194. The mixed liquor suspended solids were removed from the sedimentation basin and almost immediately recycled to the aeration basin. The ash residue of the return sludge suspended solids was maintained at 27.2%. During operations during the month period described above, the average temperature of the raw sewage was 85 degrees.

The suspended solids content of the final effluent was 9 p.p.m. and the BOD of the final effluent was 5 p.p.m.

Various changes and modifications of the invention can be made and, to the extent that such variations incorporate the spirit of this invention, they are intended to be included within the scope of the appended claims.

I claim:
1. In an activated sludge sewage treatment process comprising
   primary treatment of raw sewage to produce a primary effluent stream,
   mixing activated sludge with said primary effluent stream to produce a mixed liquor stream,
   aerating said mixed liquor stream for a period of time to produce an aerated mixed liquor stream including
      a liquid phase, and
      a suspended solids phase comprising activated sludge,
   separating said suspended solids from said liquid phase,
   recycling a portion of said separated suspended solids as a return sludge stream to said mixing step,
   disposing of the remainder of said separated suspended solids, and
   discharging said separated liquid phase as a final effluent stream,
the steps in combination with said process whereby the length of the aeration period is controlled to achieve optimum biochemical oxidation of the organic components in said mixed liquor, thereby providing a final effluent stream of improved quality, said steps comprising:
   (a) periodically measuring the ash contents of the aerated mixed liquor suspended solids and the return sludge suspended solids, and
   (b) terminating said aeration period when the ash content of said mixed liquor suspended solids is between about 25–40%, and
   (c) maintaining the ash content of the return sludge suspended solids within −8 to +1 percentage units of the ash content of said mixed liquor suspended solids.

2. The process of claim 1 in which the aeration period is terminated when the ash content of the mixed liquor suspended solids is between about 28–34%.

3. The process of claim 1 in which the ash content of the return sludge suspended solids is maintained within 0 to −2 percentage units of the ash content of the mixed liquor suspended solids.

References Cited

Keefer, C. E.: Journal WPCF, vol. 35, Sept. 1963, pp. 1166–1173.

Stewart, M. J.: Water and Sewage Works, vol. 111, June 1964, pp. 295–297.

MICHAEL E. ROGERS, *Primary Examiner.*